(12) United States Patent
Gerlitz et al.

(10) Patent No.: US 6,653,369 B2
(45) Date of Patent: Nov. 25, 2003

(54) WATER DILUTABLE AMINE CURING AGENTS FOR AQUEOUS TWO COMPONENT EPOXY RESIN SYSTEMS

(75) Inventors: Martin Gerlitz, Graz (AT); Thomas Fischer, Graz (AT); Andreas Gollner, Graz (AT); Manfred Gogg, Lieboch (AT); Elfriede Prucher, Graz (AT); Heike Schneeberger, Leibnitz (AT); Josef Wenzl, Ligist (AT)

(73) Assignee: Solutia Austria GmbH, Werndorf (AT)

( * ) Notice: Subject to any disclaimer, the term of this patent is extended or adjusted under 35 U.S.C. 154(b) by 0 days.

(21) Appl. No.: 10/139,461

(22) Filed: May 6, 2002

(65) Prior Publication Data

US 2003/0001135 A1 Jan. 2, 2003

(30) Foreign Application Priority Data

Jun. 15, 2001 (DE) .......................... 101 28 889

(51) Int. Cl.⁷ ............................. C08K 3/20; C08L 63/02
(52) U.S. Cl. ........................ 523/404; 523/414; 523/416; 523/417; 525/526; 528/111; 528/120; 528/121; 528/123; 528/407; 528/420
(58) Field of Search ................... 525/526; 523/404, 523/414, 416, 417; 528/111, 120, 121, 122, 123, 407, 418, 419, 420

(56) References Cited

U.S. PATENT DOCUMENTS

| 4,246,148 A | | 1/1981 | Shimp et al. | |
| 4,608,405 A | | 8/1986 | DeGooyer | |
| 5,539,023 A | * | 7/1996 | Dreischhoff et al. | ........ 523/404 |

FOREIGN PATENT DOCUMENTS

| EP | 0 000 605 B1 | 2/1979 |
| EP | 0 707 609 A1 | 1/1995 |

* cited by examiner

Primary Examiner—Robert Dawson
Assistant Examiner—D. Aylward
(74) Attorney, Agent, or Firm—ProPat, L.L.C.

(57) ABSTRACT

Water dilutable amine curing agents for aqueous epoxy resin dispersions, comprising a combination of an epoxide-amine adduct with an emulsifier, the epoxide-amine adduct being obtainable by reacting a polyepoxide with a reaction product of an amine and an epoxide component or an amine and subsequent reaction with an epoxide component, the amount of amine being chosen such that the number of nitrogen-attached hydrogen atoms the number of epoxide groups by a factor of from 2 to 10, and the emulsifier being obtainable by reacting diepoxides or polyepoxides with compounds that are at least difunctional with respect to epoxides, optionally with compounds D that are monofunctional with respect to epoxides, and with amines G which contain at least one tertiary and at least one primary or at least two secondary amino group(s).

24 Claims, No Drawings

WATER DILUTABLE AMINE CURING AGENTS FOR AQUEOUS TWO COMPONENT EPOXY RESIN SYSTEMS

The invention relates to water dilutable amine curing agents for aqueous two component epoxy resin systems.

In U.S. Pat. Nos. 4,246,148 and 4,608,405, water dilutable curing agents for epoxy resins are described for curing at room temperature which are prepared by a multistage reaction in which an aromatic diglycidyl ether, optionally a diglycidyl ether of an aliphatic diol, and an aromatic polyol are reacted in the presence of a suitable catalyst to form a linear diepoxide whose epoxide groups are then reacted completely with a polyamine. All remaining primary amino groups of this epoxide/amine adduct are thereafter reacted with a monoepoxide or a monocarboxylic acid in order to prolong the service life of the curing agents. However, these curing agents have a number of serious disadvantages: for the preparation of the curing agents it is necessary to use preferably organic solvents, which remain in the end product; and the water dilutability of the curing agents is achieved by (at least partial) neutralization of the amino groups with organic monocarboxylic acids, which escape from the film only in the course of curing at a relatively high temperature. Accordingly, the water dilutable curing agents have an ionic structure and are therefore of poor compatibility, for example, with nonionically stabilized aqueous epoxy resins.

The synthesis of the curing agents described in the cited U.S. patents leaves them with only secondary amino groups. In comparison with curing agents also containing primary amino groups, they are less reactive; as a result, the crosslinking density is lowered, which has deleterious consequences for the technological properties (e.g., hardness, integrity, abrasion resistance) of the epoxy resin coatings.

In EP-A 0 000 605, curing agents ABC for aqueous epoxy resin dispersions are disclosed that are obtained by reacting an adduct A of at least one polyepoxide compound a1 and at least one polyalkylene ether polyol a2 having an average molar mass of from 200 to 10,000 g/mol by reaction in an equivalents ratio (ratio of the number of epoxide groups in a1 to the number of hydroxyl groups in a2) of N(EP):N(OH)=2:(0.1 to 1.5) with a polyamine or polyamine mixture B in a 2-fold to 10-fold excess of the number of N—H groups relative to the number of remaining reactive epoxide groups. Further, unsaturated compounds C capable of addition reaction, such as (meth)acrylic acid or the esters or amides thereof, or acrylonitrile, are subjected to addition reaction with the reactive groups of the polyamine B.

These solvent-free nonionic curing agents for aqueous epoxy resins have outstanding technological properties, but aqueous dilute solutions of these amine curing agents are unstable even at slightly increased temperatures, e.g., at above 40° C., and separate into two phases, thereby impairing their processing.

Furthermore, it is possible for the unsaturated compounds added onto the reactive groups of the polyamine to be released as such, particularly at relatively high temperatures, in a retro-Michael addition reaction. Since the unsaturated compounds used are not toxicologically acceptable, this severely restricts applications at relatively high temperatures. Without the reaction of the amines B with the unsaturated compounds C prior to their addition reaction with the epoxide-functional compounds A, however, the practical usage time (pot life) of the coating systems prepared using the curing agents ABC and aqueous polyfunctional epoxy resin dispersions is too low.

There is therefore a need to eliminate these disadvantages of the curing agents described in EP-A 0 000 605 while retaining or improving their other performance properties.

In EP-A 0 707 609, aqueous curing agents for aqueous epoxy resins are disclosed which are prepared by reacting alkylene polyamines having fewer than 12 carbon atoms, aromatic monoglycidyl ethers, and diglycidyl ethers.

Polyamines which can be used in principle as curing agents are unsuited to use as curing agents in aqueous systems since they are generally readily soluble in water and thus readily form aqueous solutions and, for example, break aqueous epoxy resin dispersions with phase separation. Emulsions of water insoluble amines normally do not impair the stability of the epoxy resin dispersions, but are not sufficiently reactive for use as curing agents.

Accordingly, there is a need to provide amine curing agents for aqueous epoxy resin dispersions that on the one hand do not adversely affect the stability of the resin dispersion but on the other hand exhibit sufficiently high reactivity as curing agents.

One solution is to provide emulsions comprising amines, for which reactive, otherwise water soluble amines are hydrophobicized—that is, subjected to appropriate chemical reactions in order to obtain reaction products whose water solubility is reduced or which even are insoluble in water. At the same time, the reactivity of the amines as curing agents must not be unduly reduced. The hydrophobicized amines are emulsified in the aqueous phase using suitable emulsifier resins.

The amines can be modified starting from an organic amine which is suitable as a curing agent, by addition or condensation reactions and also by substitution of the organic radical.

The present invention provides water dilutable amine curing agents H for aqueous epoxy resin dispersions, comprising a combination of an adduct ABC with an emulsifier DEFG, said adduct ABC being obtainable by at least two-stage reaction of a polyepoxide A, which may have been modified by reaction with a polyalkylene ether polyol A2, with I. a reaction product of an amine B and an epoxide component C, or II. an amine B and subsequent reaction with an epoxide component C, the amount of amine B being chosen such that the number of nitrogen-attached hydrogen atoms exceeds the number of epoxide groups A by a factor of from 2 to 10, and the emulsifier DEFG being obtainable by reacting diepoxides or polyepoxides F with compounds E that are at least difunctional with respect to epoxides, optionally with compounds D that are monofunctional with respect to epoxides, and with amines G which contain at least one tertiary and at least one primary or at least one tertiary and at least two secondary amino group(s).

The specific content of amine hydrogen atoms in ABC is preferably from 3 to 8 mol/kg, in particular from 3.5 to 7 mol/kg, and with particular preference from 4.0 to 6.0 mol/kg.

The mass fraction of emulsifier resin DEFG, based on the sum of the masses of the dissolved or dispersed resins (curing agent ABC and emulsifier DEFG), is preferably between 10 and 40%.

In the context of the invention it is also possible when preparing the adduct ABC to carry out, in the first step, the reaction of A with a reaction product of a portion C1 of the epoxide component C and with an amine B and, in the second step, to react this product with the remaining epoxide C2, where the chemical nature of the first (C1) and second (C2) portion of the epoxide component C may be different.

The 1,2-epoxide compounds corresponding to A are polyepoxides containing on average more than one epoxide group, preferably at least two epoxide groups, per molecule. These epoxide compounds may be either saturated or unsaturated and may be aliphatic, cycloaliphatic, aromatic and/or heterocyclic and may also contain hydroxyl groups and/or other functional groups which do not cause disruptive side reactions under the conditions of mixing or reaction; examples include alkyl or aryl substituents, ether groups, and the like. Suitable, for example, are the epoxides of polyunsaturated hydrocarbons (e.g., vinylcyclohexene, dicyclopentadiene, cyclohexadiene, cyclododecadiene, isoprene, butadiene, 1,5-hexadiene, polybutadiene, divinylbenzenes and the like), oligomers of epichlorohydrin and the like, S- and N-containing epoxides (N,N-diglycidylaniline, N,N'-dimethyldiglycidyl-4,4-diaminodiphenylmethane) and also epoxides prepared by customary methods from polyunsaturated carboxylic acids or monounsaturated carboxylic esters of unsaturated alcohols, polyglycidyl esters obtainable by polymerization or copolymerization of glycidyl esters of unsaturated acids or from other acidic compounds (cyanuric acid, diglycidyl sulfide, cyclic trimethylene trisulfone, and derivatives thereof, and others), and also polyglycidyl esters of polycarboxylic acids obtained by reacting epichlorohydrin or similar epoxide compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid, and dimerized fatty acids such as dimerized linolenic acid (e.g., diglycidyl adipate, diglycidyl phthalate, and diglycidyl hexahydrophthalate). Particularly suitable are the glycidyl ethers of polyhydric phenols or alcohols, such as bisphenol A diglycidyl ether, bisphenol F diglycidyl ether, the diglycidyl ether of bisphenol S (dihydroxydiphenyl sulfone), dihydroxybiphenyl and dihydroxydiphenyl ether, and also neopentyl glycol diglycidyl ether, 1,4-butanediol diglycidyl ether, and 1,6-hexanediol diglycidyl ether.

If desired, before being reacted with the amine B or with the reaction product of amine B and epoxide component C, the epoxides A are further modified by reaction with polyalkylene polyethers A2. Component A2 must, however, be used only in amounts such that the adduct ABC does not become inherently water soluble or water dispersible. For the sake of simplicity, the epoxide modified by reaction with A2 is also referred to below as "A".

The polyalkylene ether polyols A2 satisfy the formula HO—(R—O)$_n$—H in which R is an alkylene radical having 2 to 6, especially 2 to 4, carbon atoms and n is an integer from 2 to 200, in particular from 5 to 100. The alkylene radicals are preferably 1,2-ethylene, 1,2-propylene, and 1,4-butylene radicals, and may be also be present in a mixture in the same molecule; it is likewise possible to use mixtures of different polyalkylene ethers having different radicals R and/or different values for n. Particular preference is given to polyethylene glycol where n=4 to 40, to polypropylene glycols, and to copolymers or block copolymers comprising these units.

The reaction of the epoxide compounds A and the polyalkylene ether polyols A2 is normally catalyzed by Lewis acids such as boron trifluoride or its complexes with tertiary amines.

The amines B preferably have at least two primary and/or secondary amino groups in the molecule, the amino groups each being attached in particular to aliphatic carbon atoms. Preference is given to diamines, both cyclic and alicyclic diamines such as meta-xylylenediamine or its hydrogenation product, 1,3-bis(aminomethyl) cyclohexane, and isophoronediamine, and branched aliphatic amines such as 2,2,4- and 2,4,4-trimethylhexane-1,6-diamine; linear aliphatic amines having 2 to 18 carbon atoms are especially preferred. Particularly suitable are αω-alkylenediamines such as ethylenediamine, 1,3-diaminopropane, 1,4-diaminobutane, and 1,6-diaminohexane, bis(3-aminopropyl) amine, bis(4-aminobutyl)amine, and bis(6-aminohexyl) amine, and the oligomeric polyethyleneimines such as diethylenetriamine, triethylenetetramine, and tetraethylenepentamine.

Suitable epoxide components C include all of the monoepoxide, diepoxide and polyepoxide compounds already mentioned under A, particular preference being given to monoepoxides. Suitable monoepoxides are epoxides of monoolefins such as 1-butene, 1-hexene, cyclopentene, and cyclohexene, glycidyl ethers of monohydric alcohols such as ethanol, n-butanol, n-hexanol, 2-ethylhexanol, decyl alcohol, glycidyl esters of linear and branched aliphatic carboxylic acids having 2 to 20 carbon atoms such as glycidyl acetate, glycidyl neopentanoate, glycidyl 2-ethylhexanoate, glycidyl neodecanoate, and the commercially available mixtures of glycidyl esters of aliphatic monocarboxylic acids which are highly branched in the a position and are sold, for example, under the trade name ®Cardura E 10. These glycidyl esters, and the glycidyl ethers of n-butanol, n-hexanol, and 2-ethylhexanol, are particularly preferred.

In accordance with variant I, the reaction of the epoxide and/or of the adduct A can take place with the reaction product of B and C; it is also possible, in accordance with variant II, to react the epoxide and/or the adduct A first with the amine B to give an adduct AB, until all of the epoxide groups of A have been consumed, and then to add the epoxide C. As already indicated above, it is of course also possible to react a portion C1 of the epoxide component C with the amine B, then to react this intermediate C1B with A until all of the epoxide groups in the latter have been consumed, to give the intermediate C1BA, and then to add the remainder C2 of the epoxide component C and continue reaction, where the epoxide compounds C1 and C2 may be the same or different or to be mixtures of different composition.

The adduct ABC, as a result of the reaction, is less hydrophilic than the amine B; in particular, it is no longer soluble in water. A compound is referred to as water insoluble here if its concentration in the aqueous phase after equilibrium has been established with 10 times the mass of water at 20° C. is less than 0.5 g in 100 g of the solution.

The adduct ABC is dispersed in the aqueous phase with the addition of a dispersant or emulsifier DEFG, preparable by reacting diepoxides or polyepoxides F containing at least two reactive epoxide groups per molecule, compounds D which are monofunctional with respect to epoxides by ring-opening addition (also referred to as chain terminators), compounds E which are difunctional in the same reaction (also referred to as chain extenders), the presence of the compounds D being optional, and amines G which contain at least one tertiary amino group and at least one primary amino group or at least two secondary amino groups. The amine G must therefore contain at least two amine hydrogen atoms. Reaction of E and F or conjoint or sequential reaction of D, E, and F in the first stage results in the formation, in an advancement reaction, of monofunctional epoxides of structure E—(F—E)$_n$—F or D—(F—E)$_n$—F which in the next stage are reacted with the amine G until all of the epoxide groups have been consumed. It is also possible first to introduce the compounds E and G and also, where appropriate, D, together and then to add the epoxide F. This method is especially preferred if neither of the compounds D and E contains an acid group or acidic hydroxyl group. The (number average) molar mass $M_n$ of the emulsifier DEFG is preferably from about 400 to about 6000 g/mol, with particular preference from about 500 to 5000 g/mol, and the ratio of the weight average molar mass $M_w$ to the number average molar mass $M_n$ is preferably between 1.5 and 2.5, with particular preference between 1.7 and 2.3.

Compounds suitable as chain terminators D are those containing one (sufficiently acidic) hydroxyl group or one secondary amino group, selected from phenols, carboxylic acids, and secondary aliphatic amines, especially hydroxyl containing secondary aliphatic amines, aliphatic hydroxy acids, and monocyclic or polycyclic phenols. Examples of preferred compounds are phenol itself, the isomeric o-, m- and p-cresols, 2-naphthol, 2,4- and 2,6-xylenol, diethanolamine, diisopropanolamine, morpholine, N-methylpiperazine, acetic and pivalic acids, lactic acid, and γ-hydroxybutyric acid.

Suitable chain extenders E are those containing two (or more) sufficiently acidic hydroxyl groups or at least two secondary or at least one primary amino group(s); preference is given to diphenols such as bisphenol A, bisphenol F, resorcinol, dihydroxybiphenyl, dihydroxydiphenyl sulfone, dihydroxybenzophenone, 1,4-bis(4'-hydroxyphenyl-2-propenyl)benzene, primary monoamines such as monoethanolamine, isopropanolamine, 2-ethylhexylamine, and the polyoxypropylene-monoamines obtainable under the trade name ®Jeffamine M series, diprimary diamines such as, for example, the polyoxypropylene-diamines obtainable under the trade name of ®Jeffamine D series, disecondary diamines such as N,N'-dimethylethylenediamine, N,N'-dimethyl-1,4-butylenediamine, and the adducts of diamines with two monoepoxides, such as, for example, the reaction product of glycidyl esters of branched aliphatic monocarboxylic acids with preferably linear aliphatic α,ω-diamines such as ethylenediamine, 1,4-diaminobutane, and 1,6-diaminohexane.

As diepoxides or polyepoxides F it is possible to use epoxide compounds, like those already mentioned under A, having at least two epoxide groups per molecule and a specific epoxide group content of from 1.5 to 6.0, preferably from 1.7 to 5.8, mol/kg. Preference is given to diepoxide compounds and, among them, particular preference to those derived from bisphenol A, bisphenol F, and mixtures thereof.

The amines G have at least one tertiary and at least one primary amino group or at least two secondary amino groups and from 4 to 10 carbon atoms. Examples of suitable amines are N,N-dimethylethylenediamine, 3-dimethylamino-1-propylamine, N,N,2,2-tetramethyl-1,3-propanediamine, N,N,N'-trimethylethylenediamine, N,N-bis(3-aminopropyl)methylamine, N,N'-bis(3-aminopropyl)piperazine, and also the corresponding N-ethyl compounds. Particular preference is given to 3-dimethylamino-1-propylamine and 3-diethylamino-1-propylamine.

The nature and amounts of the reactants in the emulsifier resin DEFG are preferably chosen such that the amine number of the emulsifier resin is from 5 to 60, in particular from 10 to 40, mg/g. On the one hand it is possible for all of the amine hydrogen atoms to be consumed by the reaction with the epoxide F; it is also possible, on the other hand, to choose the nature and amounts of the reactants D, E, F, and G such that amine hydrogen atoms still remain in the emulsifier resin and react with the curing agent H when it is used to cure the epoxy resin. In this case it is preferred to choose the nature and amounts of the reactants D, E, F, and G such that the fraction of the amine number found for DEFG that does not originate from tertiary amino groups is at least 2 mg/g.

The amine number is defined in accordance with DIN 53 176 as the ratio of that mass $m_{KOH}$ of potassium hydroxide which consumes exactly the same amount of acid for neutralization as a sample under analysis to the mass $m_B$ of this sample (mass of the solids in the sample in the case of solutions or dispersions); its customary unit is "mg/g".

The emulsifier resins DEFG described may also be used as emulsifiers for other amine curing agents which are not inherently soluble or dispersible in water. In this case it is preferred to use these amine curing agents in a mixture with the adducts ABC. Examples of suitable amine curing agents which are not themselves soluble or dispersible in water include polyamidoamines and Mannich bases. Preferred polyamidoamines are reaction products of fatty acids such as tall oil fatty acid with aliphatic polyamines such as ethylenediamine, diethylenetriamine, and higher polyalkylenepolyamines, and also polyamides containing amino end groups from dimerized fatty acids or mixtures containing dimerized fatty acids, and amines containing at least two primary amino groups. Preferred Mannich bases are reaction products of phenol, cresols or xylenols with formaldehyde and secondary aliphatic amines, especially 2-(dimethylaminomethyl)phenol and 2,4,6-tris(dimethylaminomethyl)phenol. As with the adducts ABC it is possible here to increase the water compatibility by incorporating hydrophilic groups, although the above conditions for water solubility or water dispersibility must be observed. The hydrophilicity can be increased with preference by incorporating oxyethylene sequences or mixtures of oxyethylene and oxypropylene sequences, as is achieved in the case of the adducts ABC by modifying the epoxide compounds A with the polyalkylene ether polyols A2. It is likewise possible to reduce the reactivity of these polyamidoamine or Mannich base curing agents, by reacting the reactive amino groups with epoxide compounds, especially monoepoxides, as in the case of the adducts ABC. A reaction with formaldehyde to form N-methylol compounds is also possible in all cases.

With the curing compositions of the invention, emulsified in water, it is possible to formulate aqueous two component epoxy resin coating systems which cure rapidly at room temperature or just slightly elevated temperature and lead to coatings offering outstanding corrosion protection. The low curing temperature is of particular interest for the coating of large or bulky metal parts which are disproportionately difficult or impossible to cure at elevated temperature in an oven, for example.

The invention is illustrated by the examples which follow:

EXAMPLES

Emulsifier Resin 1

A mixture of 913 g of ®Beckopox EP 140 (bisphenol A diglycidyl ether having a specific epoxide group content of 5.56 mol/kg), 211 g of bisphenol A (0.92 mol) and 181 g of phenol (1.92 mol) was heated to about 110 to 120° C. under a nitrogen atmosphere and stirred until a homogeneous mixture had formed. This mixture was then cooled to about 80° C. and 55 g of 3-dimethylamino-1-propylamine (0.54 mol) were added. The mixture heated up during the addition, and then was heated to 160° C. and stirred for about 4 hours.

1360 g of a product having an amine number (tertiary amino groups) of 22.2 mg/g were obtained; amine hydrogen atoms were not longer detectable. The product was diluted for further processing by adding toluene.

Emulsifier Resin 2

A mixture of 44 kg of monoethanolamine (720 mol, 1440 mol of amine hydrogen atoms), 550 kg of a polyoxypropylenediamine (®Jeffamin D 230, number average molar mass 230 g/mol) and 55 kg of 3-dimethylamino-1-propylamine was charged to a vessel; a toluene solution of 720 kg of ®Beckopox EP 140 and 600 kg of ®Beckopox EP 301 (epoxy resin having a specific epoxide group content of 2.1 mol/kg), the mass fraction of solids of the solution being 80%, was added to the aforementioned mixture, with the reactor being cooled during the addition. The rate of addition was set so that the temperature of the reaction material did not rise above 125° C. After the end of reaction, the composition was diluted further to a mass fraction of solids of 70% by adding toluene.

Epoxide-amine Adduct 1

438 g of triethylenetetramine were charged to a flask and a solution of 950 g of ®Beckopox EP 301 (epoxy resin having a specific epoxide group content of 2.1 kg/mol in xylene, resin concentration 75 g in 100 g of the xylene solution) was metered in at a temperature rising from 90° C. to 130° C. After the end of reaction (subsidence of the exotherm), the composition was heated to 250° C. and the solvent was distilled off under reduced pressure together with the excess amine. After cooling to 120° C., methoxypropanol was added and the mass fraction of solids was adjusted to 80%. The specific content of amine hydrogen atoms (based on the mass of the resin solids) was 8 mol/kg.

Epoxide-amine Adduct 2

In the first stage, an adduct of 1000 g of polyethylene glycol ($M_n$=1000 g/mol) and 1800 g of ®Beckopox EP 140 (bisphenol A diglycidyl ether having a specific epoxide group content of 5.56 mol/kg) was prepared using 7.5 g of a boron trifluoride-amine complex (®Anchor 1040 from Air Products) as catalyst. The temperature was raised from an initial 125° C. to 150° C. and maintained until the mixture had reached a specific epoxide group content of 2.8 mol/kg.

Then 720 g of the product from the first stage were added dropwise with cooling to 400 g of diethylenetriamine; by controlling the addition, the temperature was held within a range from 90 to 130° C. After the exothermic reaction had subsided, the reaction mixture was heated to 220° C.; the excess amine was distilled off under reduced pressure. After pressure compensation and cooling to about 120° C., the reaction mixture was diluted to a mass fraction of solids of 80% by adding toluene. The product had a specific amine hydrogen content of 8.3 mol/kg (based on the mass of the resin solids).

Amine Curing Agent 1

A solution of 1250 g of the epoxide-amine adduct 1 was charged to a reactor and heated to about 80 to 100° C., after which 225 g of n-butyl glycidyl ether (amount of substance of epoxide groups 1.5 mol) were metered in slowly so that, with cooling, the temperature did not exceed 110° C. After the end of the reaction, a volume of the solution of emulsifier resin 2 corresponding to 495 g of resin solids (mass fraction of the emulsifier relative to the mass of total resin solids: about 25%) was added and the mixture was homogenized thoroughly at 120° C. over 30 minutes, after which it was heated to about 130 to 140° C. and the auxiliary solvents present were stripped off as completely as possible by distillation under reduced pressure.

After the mixture had been cooled to 120° C., 200 g of methoxypropanol (=about 10% based on the amount of all resin solids) were added followed by the metered addition of a further 200 g of water, after which at a temperature of about 80 to 90° C., 20 g of glacial acetic acid (about 1% based on a mass of total resin solids) were added. Following a homogenization phase of 30 minutes, dispersion was carried out with further water, with the temperature dropping.

This gave a storage stable, aqueous product having a mass fraction of solids of 50% with a viscosity of from about 10 to 15 Pa•s (23° C.). The specific content of amine hydrogen atoms was 5.26 mol/kg (based on the mass of the resin solids; based on the mass of the solution it was 2.6 mol/kg).

Amine Curing Agent 2

A solution of 930 g of the epoxide-amine adduct 2 was charged to a reactor and heated to 80 to 100° C., after which a mixture of 155 g of 2-ethylhexyl glycidyl ether (0.7 mol) and 38 g of hexanediol diglycidyl ether (amount of substance of the epoxide groups 0.25 mol) was metered in slowly so that, with cooling, the temperature did not exceed 110° C. After the end of the reaction, a solution of 285 g of the emulsifier resin 1 (mass fraction of the emulsifier relative to the mass of total resin solids: about 20%) was added and the mixture was homogenized thoroughly at 120° C. over 30 minutes, after which it was heated to about 130 to 140° C. and the auxiliary solvents present were stripped off as completely as possible by distillation under reduced pressure.

After the mixture had been cooled to 120° C., 140 g of methoxypropanol (about 10% of the mass of the total resin solids) were added followed by the metered addition of 100 g of water, after which at a temperature of about 80 to 90° C., 30 g of glacial acetic acid (about 2% of the mass of total resin solids) were added. Following a homogenization phase of 30 minutes, dispersion was carried out by adding a further quantity water, with the temperature dropping.

This gave a storage stable, aqueous product having a mass fraction of solids of 55% with a viscosity of from about 14 to 18 Pa•s (23° C.). The specific content of amine hydrogen atoms was 4.76 mol/kg (based on the mass of the resin solids; based on the mass of the solution supply form it was 2.63 mol/kg).

Paint Formulation

When using shear stable aqueous epoxy resin dispersions (for example, ®Beckopox EP 384w, ®Beckopox VEP 2381w) the pigments may be dispersed both in the resin component and in the curing component. In order to achieve a higher pigment/binder ratio, however, it is preferred to disperse the pigments and fillers used in the resin component. The corrosion protective properties of the 2K system of the invention are strongly influenced by the amount of curing agent used, which, however, must be specifically optimized for each amine curing agent. For primer formulas, 60 to 80% of the amount of curing agent calculated from the stoichiometry have generally proven optimal for the corrosion protection properties.

Performance Results

In accordance with the data in the following table, mixtures of the epoxy resin dispersion ®Beckopox EP 384w (solid epoxy resin dispersion "type 1", specific epoxide group content 1.02 mol/kg, based on the mass of dispersion; and 1.92 mol/kg based on the mass of resin solids) and of the specified curing agents were used to coat sandblasted iron panels with a dry film thickness of 50 μm. The panels were stored at room temperature (20° C.) for seven days following application.

The table lists the results after 1000 h of salt spray testing (DIN 50021) and humidity confinement testing (DIN 50017).

TABLE

Corrosion protection properties of the paints

|  | Paint 1 | Paint 2 | Paint 3 | Paint 4 |
|---|---|---|---|---|
| Epoxy resin dispersion | | 47.0 g ($n_{EP}$ = 48 mmol) | | |
| Amine curing agent 1 | 13.7 g $n_H$ = 36 mmol | | 18.2 g $n_H$ = 48 mmol | |
| Amine curing agent 2 | | 13.7 g $n_H$ = 36 mmol | | 18.2 g $n_H$ = 48 mmol |
| Degree of crosslinking | 75% | 75% | 100% | 100% |
| Scribe creep | 2 mm | 2 mm | delamination | delamination |
| Cross-hatch* | 0 | 0 | 5 | 5 |
| Blistering* | 0 to 1 | 0 to 1 | 5 | 5 |

*Evaluation:
0 best score
5 worst score
$n_{EP}$: Amount of substance of the epoxide groups
$n_H$: Amount of substance of the amine-hydrogen atoms

What is claimed is:

1. A water dilutable amine curing agent H for aqueous two component epoxy resin systems, comprising a combination of an adduct ABC with an emulsifier DEFG, said adduct ABC being obtainable by reacting a polyepoxide A with
   I a reaction product of an amine B and an epoxide component C, or
   II an amine B and subsequent reaction with an epoxide component C,
the amount of amine B being chosen such that the number of nitrogen-attached hydrogen atoms exceeds the number of epoxide groups A by a factor of from 2 to 10, and the emulsifier DEFG being obtainable by reacting diepoxides or polyepoxides F with compounds E that are at least difunctional with respect to epoxides, optionally with compounds D that are monofunctional with respect to epoxides, and with amines G which contain at least one tertiary and at least one primary or at least two secondary amino group(s).

2. The water dilutable amine curing agent as claimed in claim 1, wherein the mass fraction of emulsifier resin DEFG, based on the sum of the masses of the dissolved or dispersed resins (curing agent ABC and emulsifier DEFG), is between 10 and 40%.

3. The water dilutable amine curing agent as claimed in claim 1, wherein the specific amount of amine hydrogen atoms in ABC is from 3 to 8 mol/kg.

4. The water dilutable amine curing agent as claimed in claim 1, wherein the compounds A are selected from the group consisting of the diepoxides bisphenol A diglycidyl ether, bisphenol F diglycidyl ether, the diglycidyl ethers of dihydroxydiphenyl sulfone, dihydroxybiphenyl, and dihydroxydiphenyl ether, and also neopentyl glycol diglycidyl ether, 1,4-butanediol diglycidyl ether, and 1,6-hexanediol diglycidyl ether.

5. The water dilutable amine curing agent as claimed in claim 1, wherein the amines B contain at least two primary and/or secondary amino groups, the amino groups each being attached to aliphatic carbon atoms.

6. The water dilutable amine curing agent as claimed in claim 1, wherein the amines B are selected from the group consisting of ethylenediamine, 1,3-diaminopropane, 1,4-diaminobutane, and 1,6-diaminohexane, bis(3-aminopropyl) amine, bis(4-aminobutyl)amine, and bis(6-aminohexyl) amine, diethylenetriamine, triethylenetetramine, and tetraethylenepentamine.

7. The water dilutable amine curing agent as claimed in claim 1, wherein the epoxide component C is selected from the group consisting of the glycidyl ethers of n-butanol, n-hexanol, and 2-ethylhexanol, and the glycidyl esters of linear and branched aliphatic carboxylic acids having 2 to 20 carbon atoms.

8. The water dilutable amine curing agent as claimed in claim 1, wherein the epoxides F used in preparing the emulsifier resin are selected from diepoxides derived from bisphenol A, bisphenol F, and mixtures thereof.

9. The water dilutable amine curing agent as claimed in claim 1, wherein the amines G used in preparing the emulsifier resin are selected from the group consisting of 3-dimethylamino-1-propylamine and 3-diethylamino-1-propylamine.

10. The water dilutable amine curing agent as claimed in claim 1, wherein chain terminators D are used in preparing the emulsifier resin and are selected from the group consisting of phenol, o-, m- and p-cresol, 2-naphthol, 2,4- and 2,6-xylenol, diethanolamine, diisopropanolamine, morpholine, N-methylpiperazine, acetic and pivalic acids, lactic acid, and γ-hydroxybutyric acid.

11. The water dilutable amine curing agent as claimed in claim 1, wherein the chain extenders E used in preparing the emulsifier resin are selected from the group consisting of bisphenol A, monoethanolamine, 2-ethylhexylamine, ethylenediamine, 1,4-diaminobutane, and 1,6-diaminohexane.

12. The water dilutable amine curing agent as claimed in claim 1, wherein the amine number of the emulsifier DEFG is from 5 to 60 mg/g.

13. The water dilutable amine curing agent as claimed in claim 1, wherein the fraction of the amine number found for the emulsifier DEFG that does not originate from tertiary amino groups is at least 2 mg/g.

14. A process for preparing a water dilutable amine curing agent H for aqueous epoxy resin dispersions, which comprises preparing a reaction product ABC by reacting a polyepoxide A with
   I. a reaction product of an amine B and an epoxide component C, or
   II an amine B and subsequent reaction with an epoxide component C,
the amount of amine B being chosen such that the number of nitrogen-attached hydrogen atoms exceeds that of the epoxide groups by a factor of from 2 to 10, and emulsifying the reaction product ABC in water with the addition of an emulsifier DEFG which is prepared by reacting diepoxides or polyepoxides F with compounds D that are monofunctional with respect to epoxides and with compounds E that are at least difunctional with respect to epoxides and with amines G which contain at least one tertiary and at least one primary or at least two secondary amino group(s).

15. The process as claimed in claim 14, wherein the reaction product ABC is prepared by reacting a polyepoxide A with a reaction product of an amine B and an epoxide component C.

16. The process as claimed in claim 14, wherein the reaction product ABC is prepared by reacting a polyepoxide A with an amine B until all of the epoxide groups have been consumed and then reacting it with an epoxide component C.

17. The process as claimed in claim 14, wherein before being reacted with the reaction product of amine B and epoxide component C and/or with the amine B the epoxides A are modified by reaction with polyalkylene ethers A2.

18. The process as claimed in claim 15, wherein first of all the amine B is reacted with a portion C1 of the epoxide component C, this intermediate C1B is reacted with the polyepoxide A, with all of the epoxide groups of A being consumed, and then the reaction with the remainder C2 of the epoxide component C is carried out.

19. The process as claimed in claim 14, wherein the emulsifier DEFG is prepared by two-stage reaction, reacting in the first stage the components E and F and also, where appropriate, D and in the second stage carrying out the reaction with the amine G.

20. The process as claimed in claim 14, wherein the emulsifier DEFG is prepared by one-stage reaction, initially introducing component E and, where appropriate, D together with the amine G and then adding the epoxide F.

21. A method of use of the emulsifier DEFG for preparing curing agents for aqueous epoxy resin dispersions, comprising dispersing water insoluble or water indispersible basic curing agents in water together with the emulsifier resin DEFG.

22. The method of use as claimed in claim 21, wherein the basic curing agents are selected from adducts ABC of epoxide compounds and amines, and from polyamidoamines and Mannich bases.

23. A method of use of a water dilutable amine curing agent as claimed in claim 1 for preparing aqueous two component coating compositions, comprising mixing the water dilutable curing agent with aqueous epoxy resin dispersions immediately before use.

24. An aqueous two component coating composition comprising an aqueous curing agent as claimed in claim 1 and aqueous epoxy resin dispersions.

* * * * *